Figure 1:
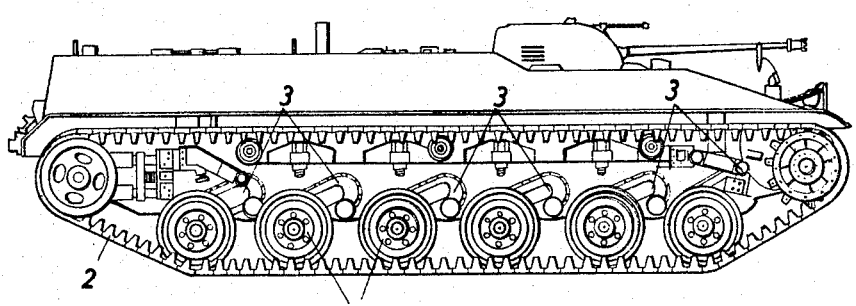

Dec. 6, 1966  W. RUF  3,290,036
DEVICE FOR SUSPENSION AND SHOCK ABSORPTION IN VEHICLES
Filed July 1, 1964  2 Sheets-Sheet 1

Inventor
Walter Ruf
By Stevens, Davis, Miller & Mosher
Attorneys

Dec. 6, 1966   W. RUF   3,290,036
DEVICE FOR SUSPENSION AND SHOCK ABSORPTION IN VEHICLES
Filed July 1, 1964   2 Sheets-Sheet 2

Inventor
Walter Ruf
By Stevens, Davis, Miller & Mosher
Attorneys

United States Patent Office

3,290,036
Patented Dec. 6, 1966

3,290,036
DEVICE FOR SUSPENSION AND SHOCK
ABSORPTION IN VEHICLES
Walter Ruf, Bottighofen, Landhaus am See,
Kanton Thurgau, Switzerland
Filed July 1, 1964, Ser. No. 379,489
Claims priority, application Germany, July 5, 1963,
R 35,605, R 35,607, R 35,608
13 Claims. (Cl. 267—15)

The invention relates to a device for suspension and shock absorption of wheels in vehicles, in particular of track wheels of track laying vehicles, such as tanks or the like.

The wheels of automotive vehicles, in particular the track wheels of tanks, are usually equipped with spring elements and also with shock absorbers. This involves a number of construction difficulties. It is known, for instance, to associate a torsion rod as a spring element with each wheel of a vehicle. Those rods usually extend transversely to the longitudinal direction of the vehicle. Access to them is difficult and they require space which is then not available for other components.

Furthermore, it is a serious problem to arrange shock absorbers in armed vehicles in such a manner that these shock absorbers are sufficiently shielded. Even ordinary bullets may be able to pierce conventional shock absorbers so that there is a high risk that such conventional shock absorbers are destroyed under fire. Heavy metal aprons, for instance, have therefore been provided to protect the shock absorbers. This causes, however, a considerable increase in the total weight, as well as other drawbacks. The damping properties of known shock absorbers are adjustable from the outside only with great difficulty or even not at all, which is disadvantageous to the driving quality of the vehicle, especially if equipped with a plurality of shock absorbers. For tanks armed with guns it is even desirable to be able to completely block the shock absorber in order to improve the accuracy of firing.

It is a general object of this invention to avoid the before-mentioned disadvantages of known absorbers.

One object of this invention is therefore to provide a device operating as a shock absorber and simultaneously as a suspension element.

It is a further object of this invention to provide a shock absorbing device and a suspension device whose damping action is adjustable.

Another object of this invention is to provide a remote control for a combined shock absorber and suspension device.

In order to accomplish the objects of this invention, in general at least a part of the used spring elements are arranged in a closed case, which is filled with a damping fluid, whereby the damping fluid is subject to a flow against frictional resistance when the spring elements are compressed or expanded.

For a better understanding of the invention together with other and further objects thereof, reference is made to the following description taken in connection with the accompanying drawings.

Figure 3:
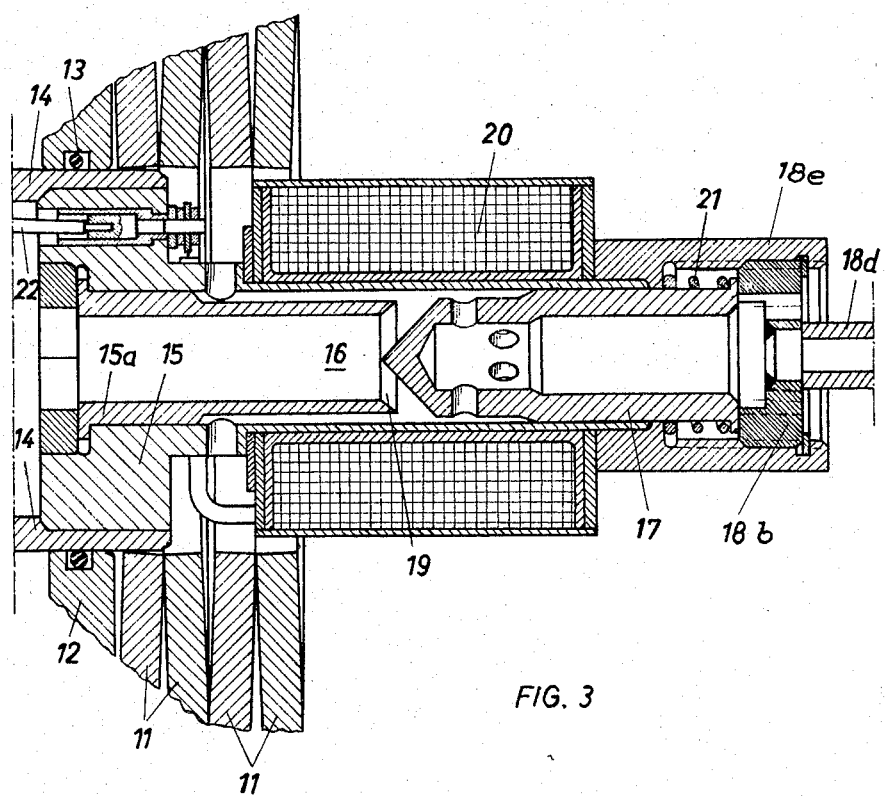
Figure 2:
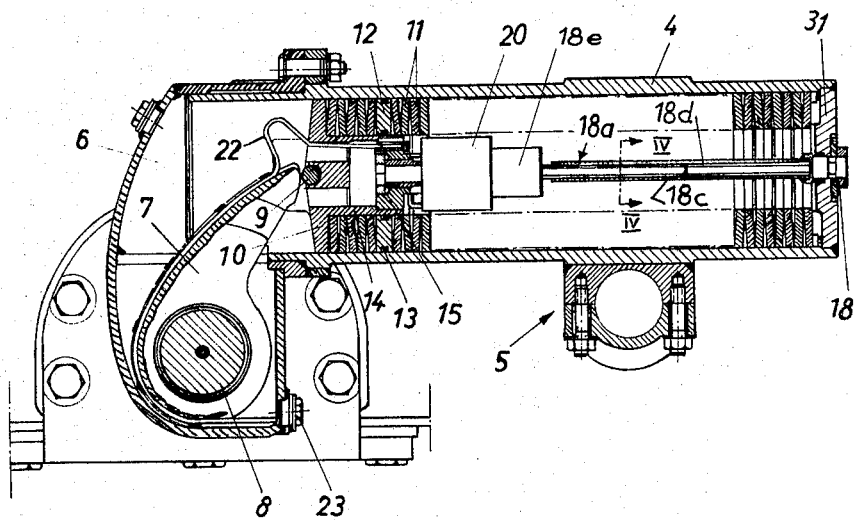

In the drawings, FIG. 1 is a side elevational view of a tank provided with suspension and shock absorbing devices according to this invention;

FIG. 2 shows a cross sectional view of a combined suspension and shock absorption device as associated with individual track wheels of the tank;

FIG. 3 in enlarged scale shows a portion of FIG 2; and

Figure 4:
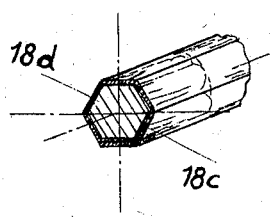

FIG. 4 in enlarged scale shows a perspective view of a cross section taken along line IV—IV of FIG. 2.

Referring now in detail to the drawings, the tank as represented in FIG. 1 is provided in a conventional manner with track wheels 1 which are surrounded by an endless track 2. Each track wheel is associated with a combined suspension and shock absorbing device 3 as depicted in cross section in FIG. 2.

The combined suspension and shock absorbing device 3 is comprised in detail of a cylindrical base 4 to which a support 5 for a corresponding axle of a respective wheel 1 is secured. A prechamber 6 is united with the cylindrical case 4.

Prechamber 6 receives a lever member or a cam member 7, which at one end is mounted pivotally about a pin or shaft 8. Shaft 8 penetrates prechamber 6 in a sealed manner and is connected rigidly to the body of the tank. The other end of the lever acts on a pressure member 9 provided with a guiding flange 10. A stack of a large number of plate springs 11 is located within case 4. The plate springs preferably have a circular shape and an outer diameter which is slightly less than the inner diameter of case 4, so that annular gaps of about 0.5–2.0 mm. are defined. Both the case 4 and the prechamber 6 are filled with a damping fluid, preferably with a liquid like oil. The gaps partly cause the frictional resistance for the flow of the damping fluid in order to obtain the desired shock absorbing effect. The one end of the plate spring stack is supported at the bottom 31 of case 4, whereas the other end of the stack contacts guiding flange 10. A sleeve portion 14 of said guiding flange 10 penetrates corresponding central bores of adjacent plate springs 11. The case 4 at its inner wall likewise could be provided with an inwardly projecting flange adapted to support one end of the spring stack instead of bottom 31 in which case the stack of plate springs 11 does not need to reach bottom 31. A ring 12 is positioned intermediate plate springs 11 which by means of sealing rings 13 forms a seal between the inner wall of the cylindrical case 4 and the outer surface of sleeve portion 14. Sealing rings 13 are received in suitable peripheral grooves provided within ring 12.

An insert 15 with a valve sleeve 15a, forming an intermediate member, is inserted into the end of sleeve 14 remote from flange 10 (cf. FIG. 3). The valve sleeve 15a is provided with a passage bore 16 the main axis of which coincides substantially with the main axis of the cylindrical case 4. At the end remote from insert 15 passage bore 16 terminates in a valve seat 19. The effective cross section of the passage bore 16 is variable by means of a valve body 17. In one end position the passage bore 16 can be completely closed by valve body 17, the adjacent end of which fits into valve seat 19.

The adjustment of valve body 17 with respect to the passage bore 16 is accomplished by rotation of an adjustment head 18 (FIG. 2) connected rigidly to a telescopic rod assembly 18a. A member 18b secured to the end of assembly 18a remote from said head 18 is threaded into a central opening provided in a fixedly mounted part 18e.

The telescopic rod assembly 18a comprises an outer rod 18c and an inner rod 18d. Both rods 18c and 18d have a noncircular cross section, for example a hexagonal cross section, the inner member 18d being inserted and fitting into the outer member 18c. Both members are moveable with respect to each other in direction of their longitudinal axes but are prevented, due to their noncircular cross section, from relative rotational movement. Accordingly, both members 18c and 18d can telescope with respect to each other if spring plates 11 are compressed. Rotation of head 18, however, moves valve body 17 towards valve seat 19 or withdraws it therefrom, depending on the direction in which head 18 is turned. The effective cross section of passage bore 16 can thus be gradually varied and also be completely blocked. A spring 21 surrounding valve body 17 is located within the central opening of part 18e and supported at the bottom of the opening and at a flange of valve body 17, respectively. This spring assures continuous contact between member 16b and valve body 17.

Valve body 17 is further surrounded by a magnet coil 20 which can be excited by supply of electric energy via a conductor 22 (FIG. 2). When coil 20 is excited, valve body 17 is moved against the action of spring 21 toward valve seat 19. Valve body 17 then closes passage bore 16, entirely blocking in this position any flow of damping fluid.

The conductor 22 which enters prechamber 6 through a fitting 23 in a sealed manner can be connected with a control device or a switch device (not shown), ensuring that the tank can drive only when the flow of the damping fluid is not blocked, and that firing of the arms of the tank is only possible if the action of the shock absorber is shut off. Instead of magnetic means 20, as shown in the drawing, hydraulic or pneumatic means likewise could be provided in order to actuate valve body 17.

The operation of the before-described device is as follows: FIG. 2 represents a position in which the plate springs 11 are compressed to a maximum, the axle or shaft of the corresponding track wheel 1 then being in its highest position. When the forces compressing the plate springs are reduced, plate springs 11 tend to reassume their normal configuration, so that the left end of the spring stack, together with ring 12, travels towards prechamber 6. This movement, however, is delayed since damping fluid has to be displaced out of the space in front of flange 10 entering thereby spaces between the individual plate springs, thereby passing through bore 16, and thereupon flowing through the narrow annular gaps between the plate springs 11 and the interior wall of the case 4. The detours around the plate springs 11 along which the damping fluid has to travel assure a certain amount of frictional resistance, as pointed out before. The absolute value of the frictional resistance of the entire system can be increased or decreased by moving valve body 17 toward or away from valve seat 19 by means of head 18.

A new stroke compressing the plate spring stack via lever 7 and pressure member 9 causes a flow of the damping fluid in the opposite direction.

If magnet coil 20 is excited, valve body 17 closes bore 16 and flow of the damping fluid is blocked. The corresponding track wheel connected to the blocked device remains exactly in the position it had at the instant when flow of damping fluid was blocked. Therefore, if all of the shock absorbing devices are blocked, the position of the tank stays unchanged also during firing action, so that the accuracy of fire is considerably increased. The proposed way of blocking the fluid flow by closing the passage bore 16 includes the advantage that all the suspension and shock absorption devices 3 associated with the track wheels 1 can be blocked in their momentary position and do not have to be brought into an end position for this purpose.

Since many changes in the above construction could be made and many apparently different embodiments of this invention could be made without departing from the scope thereof, it is intended that all matter contained in the above description or shown in the accompanying drawings shall be interpreted as illustrative and not in a limiting sense.

What is claimed is:

1. Device for the spring suspension and shock absorption of the wheels of vehicles, said device comprising a closed housing which is adapted to be connected with a wheel of the vehicle and which is filled with a damping liquid, spring elements which are arranged in the housing and the damping liquid, a ram member one end of which acts on the spring elements and the other end of which is adapted to be rigidly connected with the vehicle, said housing including an opening which divides the housing into two compartments and which, upon the inward and outward spring action of the spring elements, permits a flow therethrough of the damping liquid, means for regulating the flow cross-section of said opening, and means for blocking said opening.

2. Device according to claim 1 in which said housing is cylindrical and said opening is formed by a valve sleeve which lies centrally in the axis of the cylindrical housing and includes a valve seat and a valve body whose distance from the valve seat is adjustable by said means for regulating the flow cross-section of said opening.

3. Device according to claim 2 in which the means for adjusting the flow cross-section of said opening consist of a telescopic rod of non-circular cross-section.

4. Device according to claim 3 in which the telescopic rod has a hexagonal cross-section and can be actuated from outside of the cylindrical housing.

5. Device according to claim 2, in which the means for blocking said opening consists of a magnet coil which at least partially surrounds the valve body and in connection with which the magnet coil can be excited via a feed line, the valve body being pressed against said valve seat.

6. Device according to claim 1, in which the spring elements are developed as cup springs and are arranged in a cylindrical housing.

7. Device according to claim 6 in which there is provided, between the cup springs, a packing ring which divides the cylindrical housing into two compartments which are in communication with each other through said opening.

8. Device according to claim 7 in which there is provided, between the inner wall of the cylindrical housing and the outer wall of the cup springs, an annular gap of a width of 0.5 to 2.0 mm. across which flows the damping liquid upon the inward and outward springing action of the cup springs.

9. Device for spring suspension and shock absorption of the wheels of track laying vehicles, said device comprising a closed cylindrical housing which is adapted to be connected with one wheel of the vehicle and which is filled with a damping liquid, cup springs which are arranged in the cylindrical housing and the damping liquid, the inner diameter of the cylindrical housing being slightly larger than the outside diameter of the cup springs, a ram member one end of which acts on the cup springs and the other end of which is rigidly connected with the vehicle, a packing ring which is arranged between the cup springs and divides the cylindrical housing into two compartments which are in communication with each other through a passage opening, a valve body opposite the passage opening and the distance of which from the passage opening is adjustable, a telescopic rod of non-circular cross-section for adjusting said distance from the valve body and for adjusting the size of the active cross-section of said passage opening, and a magnetic coil which at least partially surrounds the valve body, and which can be excited via a feed line, the valve body being pressed against said passage opening.

10. Armored track laying vehicle with wheels and associated shock absorbing and spring suspension means, each of said means comprising a closed housing which is connected with a wheel of the vehicle and is filled with a damping liquid, spring elements which are arranged in the housing and the damping liquid, a ram member one end of which acts on the spring elements and the other end of which is rigidly connected with the vehicle, in the housing a passage opening which divides the housing into two compartments and through which flows, upon the inward and outward springing action of the spring elements, the damping liquid, means for regulating the flow cross-section of the passage opening and means for blocking the passage opening.

11. Armored track laying vehicle according to claim 10 in which the means for blocking the passage opening consists of a magnetic coil which surrounds at least a part of a valve body which is adapted to close the passage opening.

12. In an armed track laying vehicle having track wheels, shock absorbing devices for said wheels, each of said shock absorbing devices comprising a closed cylindrical case containing a damping fluid and being pivotally connected to at least one of said wheels, a lever moveable with respect to said case and rigidly connected at one end to the body of said vehicle, a series of plate springs arranged within said case, one end of said series of plate springs being supported at said case and the other end of said series of plate springs being moveable with respect to said case and being engaged by the other end of said lever, the inner diameter of said case exceeding slightly the outer diameter of said plate springs, annular gaps thus being formed between said plate springs and said case, said gaps being adapted to permit under the influence of forces changing the position of said lever relative to said case, passage of said damping fluid within said case against frictional resistance, an intermediate member having a passage bore and a valve seat, said intermediate member being associated with said plate springs, a valve body moveable with respect to said valve seat, a magnet coil enclosing said valve body, means being provided to excite the coil of all of said shock absorbing devices simultaneously in such a manner that said valve body is pressed against said valve seat in order to close said passage bore and to thereby block the flow of said damping fluid.

13. In an armed track laying vehicle having track wheels the shock absorbing devices of claim 12, for each of said wheels, means being provided to control said exciting means in such a manner that said shock absorbing devices are blocked, when the arms of said vehicle are fired, and that said shock absorbing devices are unblocked, when said vehicle is moving.

References Cited by the Examiner

UNITED STATES PATENTS

| 2,004,539 | 6/1935 | Rossman | 267—15 |
| 2,059,434 | 11/1936 | Broulhiet | 267—20 |
| 2,608,419 | 8/1952 | Watts | 267—20 |
| 3,117,800 | 1/1964 | Mosmuson | 280—124 |

FOREIGN PATENTS

| 1,261,121 | 4/1961 | France. |
| 447,075 | 5/1936 | Great Britain. |
| 664,770 | 1/1952 | Great Britain. |

ARTHUR L. LA POINT, *Primary Examiner.*

R. M. WOHLFARTH, *Assistant Examiner.*